Aug. 27, 1935.　　　　O. H. BANKER　　　　2,012,296
CHANGE SPEED TRANSMISSION
Filed Feb. 27, 1933　　　6 Sheets-Sheet 1

INVENTOR
Oscar H. Banker
BY
Charles A. French
ATTORNEYS

Aug. 27, 1935.    O. H. BANKER    2,012,296
CHANGE SPEED TRANSMISSION
Filed Feb. 27, 1933    6 Sheets-Sheet 3

INVENTOR
Oscar H. Banker
BY
Charles & French
ATTORNEY

Aug. 27, 1935.  O. H. BANKER  2,012,296
CHANGE SPEED TRANSMISSION
Filed Feb. 27, 1933  6 Sheets-Sheet 4
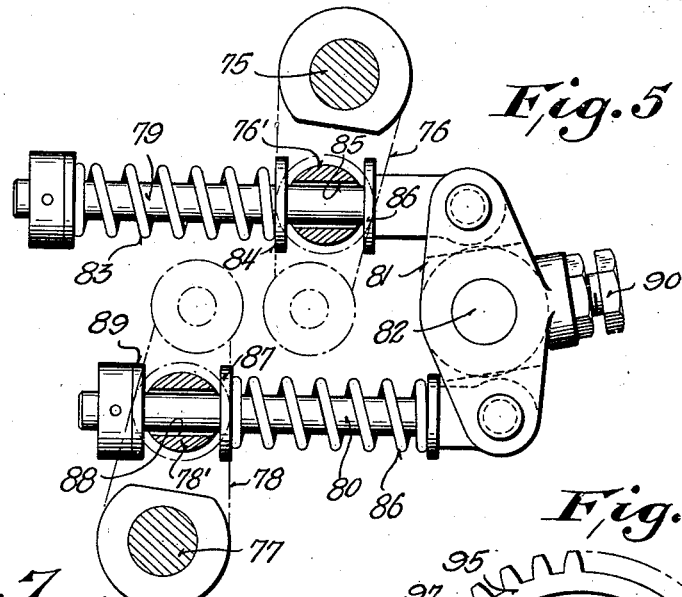
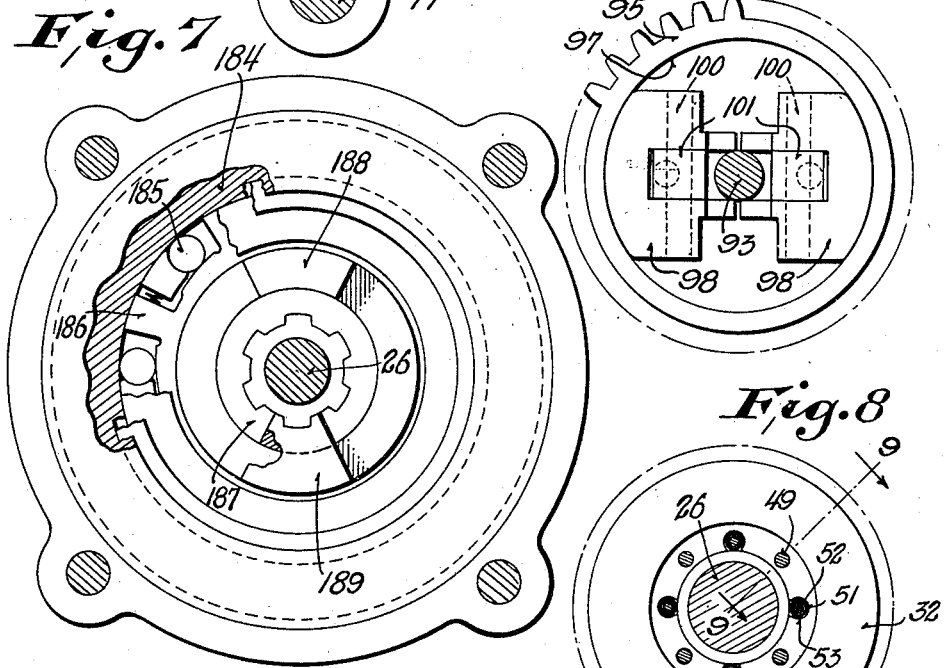
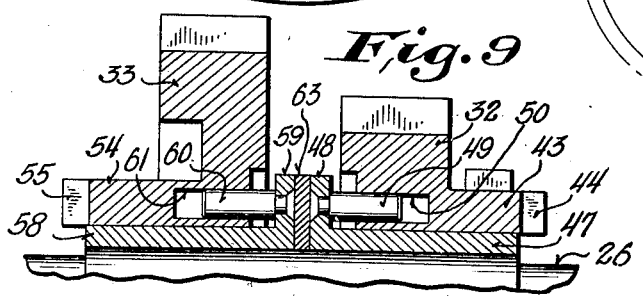
INVENTOR
Oscar H. Banker
BY
Charles & French
ATTORNEYS Aug. 27, 1935.    O. H. BANKER    2,012,296
CHANGE SPEED TRANSMISSION
Filed Feb. 27, 1933    6 Sheets-Sheet 5

INVENTOR
Oscar H. Banker
BY
Charles & French
ATTORNEYS

Aug. 27, 1935.  O. H. BANKER  2,012,296
CHANGE SPEED TRANSMISSION
Filed Feb. 27, 1933  6 Sheets—Sheet 6
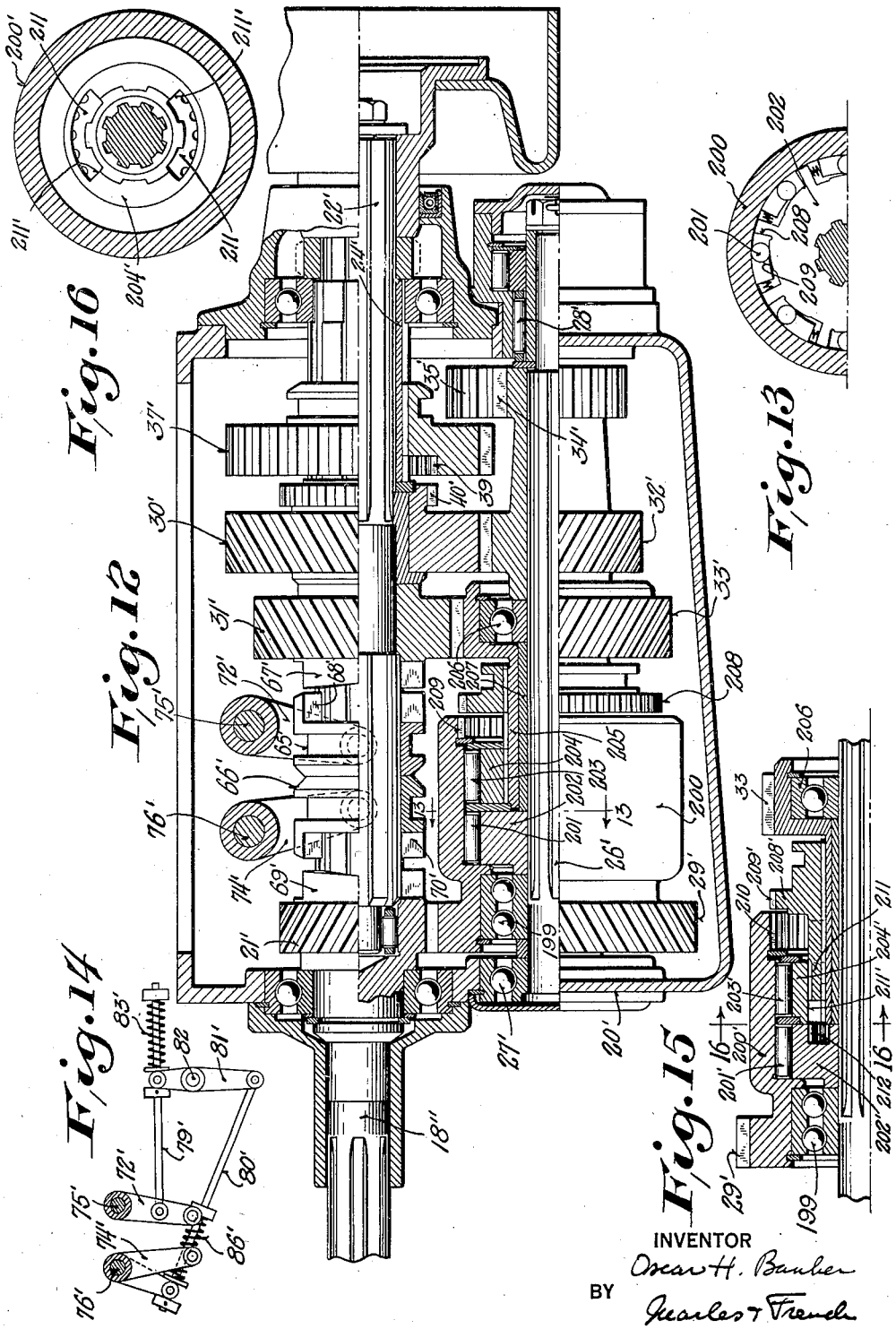
INVENTOR
Oscar H. Banker
BY
Charles T. French
ATTORNEYS

Patented Aug. 27, 1935

2,012,296

UNITED STATES PATENT OFFICE 2,012,296

CHANGE SPEED TRANSMISSION

Oscar H. Banker, Chicago, Ill., assignor to New Products Corporation, Chicago, Ill., a corporation of Illinois Application February 27, 1933, Serial No. 658,747

10 Claims. (Cl. 74—336.5)

The invention relates to change speed transmissions.

One of the objects of the invention is to provide an automatic change speed transmission wherein the speed responsive mechanism for controlling or effecting the speed changes is formed as a separate unit so associated with the transmission that it may be readily detached therefrom for repairs or any other purpose without dismantling the transmission itself.

A further object of the invention is to provide a simple means in a transmission of the character described whereby the transmission may be put back to second from high at any car speed and also put back into low gear from a higher gear ratio at any car speed and may be positively locked in second or low if the operator so desires.

Heretofore in automatic transmissions having speed responsive mechanism for effecting the speed changes the adjustment of such mechanism had to be done in a shop or garage and was not adapted to be changed while the vehicle was in motion. A further and very important object of the present invention is to provide an automatic unit whose adjustment may be readily effected at any time whether the vehicle is in motion or standing still and is under the control of the driver from his seat. Thus the driver may vary the automatic functions of the present construction to suit the different conditions of country over which he is driving.

The invention further consists in the several features hereinafter set forth and more particularly defined by claims at the conclusion hereof.

In the drawings:

Fig. 5 is a detail view of the clutch shifting linkage, parts being shown in section;

Fig. 6 is a detail front elevation view of the governor;

Fig. 7 is a detail end view of a portion of the device showing the automatic brake mechanism, parts being broken away and parts being shown in section and the cover removed;

Fig. 8 is a detail sectional view taken on the line 8—8 of Fig. 1;

Fig. 9 is a detail sectional view taken on the line 9—9 of Fig. 8;

Fig. 10 is a side elevational view of the trans- mission, parts being broken away and parts being shown in secton;

Fig. 11 is a detail projected profile view of the control cam;

Fig. 12 is a sectional view similar to Fig. 1 showing certain modifications;

Fig. 13 is a detail sectional view taken on the line 13—13 of Fig. 12;

Fig. 14 is a detail view of clutch shifting linkage for the modification shown in Fig. 12;

Fig. 15 is a detail sectional view showing certain modifications;

Fig. 16 is a detail sectional view taken on the lines 16—16 of Fig. 15.

Figure 1:
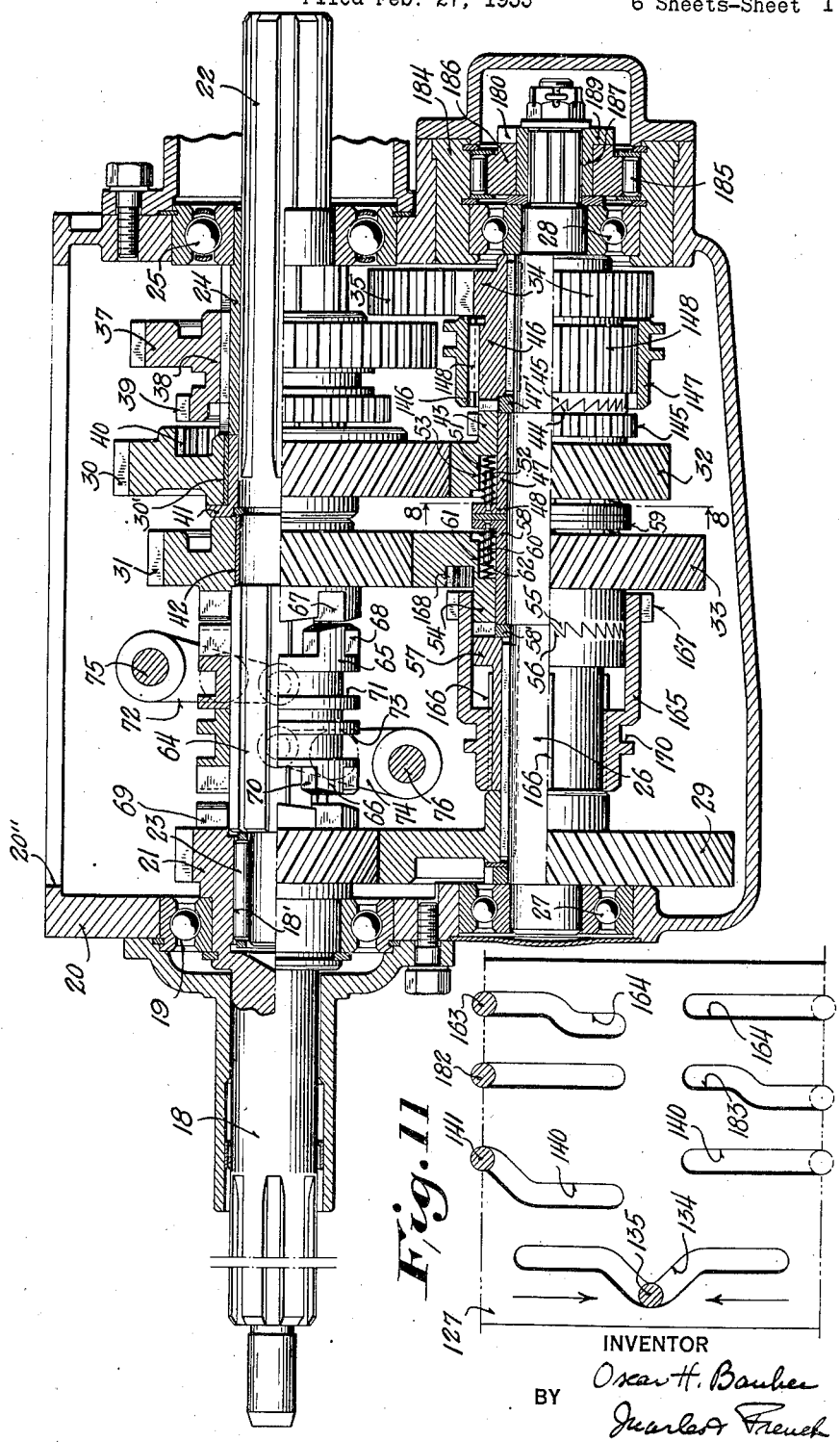
Fig. 1 is a central vertical sectional view through a transmission mechanism embodying the invention, parts of the interior mechanism being shown half in full and half in section.

Referring to the drawings, the numeral 18 designates the transmission drive shaft which may be connected to the engine shaft through any suitable clutch mechanism though preferably one of the automatic type.

The shaft 18 is journalled in a ball bearing journal 19 mounted in the front wall of the casing 20, said shaft having a gear 21 formed thereon or secured thereto.

The driven shaft 22 is coaxially arranged relative to the shaft 18 and has one end projecting into an axial bore 18' in the shaft 18 and journalled in roller bearings 23 mounted in said bore and its other end portion has a sleeve 24 splined thereto and journalled in a ball bearing 25 mounted in the rear wall of the casing 20.

A lay or auxiliary shaft 26 is mounted in bearings 27 and 28 in the end walls of the casing and in parallel relation to the shafts 18 and 22 and has a gear 29 keyed thereto and meshing with the gear 21.

Spiral gears 30 and 31 are mounted on the shaft 22 and constantly mesh respectively with spiral gears 32 and 33 on the shaft 26, the gear 30 being of somewhat larger diameter than the gear 31 which in turn is somewhat larger in diameter than the gear 21.

With the above described gearing, low speed is obtained by driving through gears 21 and 29 to shaft 26 and through the gears 32 and 30 to the shaft 22; second speed by driving through gears 21 and 29 to shaft 26 and through the gears 33 and 31 to the shaft 22; high speed by a direct drive connection between the shafts 18 and 22; and reverse through gears 21 and 29 to shaft 26 and through a gear 34 on shaft 26 meshing with a back gear 35 on a stud shaft 36 which gear is adapted to mesh with a gear 37 having a hub 38 slidably splined on the sleeve 24 and hence connected to the shaft 22. It is to be noted that the reduction ratio between the gears 27 and 29 comprises the major part of the reduction ratio of the gearing and that the reduction ratio between the gears 30, 32 and 31, 33 is small with the result that the speed of rotation of the gears 33 and 32 relative to the drive shaft will be low when the transmission is in its high gear ratio.

The hub portion 38 of the gear 37 is provided with a clutch gear part 39 adapted to be moved into mesh with an annular clutch gear element 40, formed as a part of or secured to the gear 30, for forward drive and to be in the position shown in Fig. 1 for the neutral position and be shifted toward the right so that gear 37 meshes with the gear 35 for the reverse drive position of the transmission.

The gear 30 is provided with a bushing 30' that may turn freely on a flanged sleeve 41 fast on the shaft 22 and the gear 31 has a bushing 42 turning freely on the shaft 22.

The gear 32 has a sleeve extension 43 provided with a clutch jaw 44 adapted to mesh with a clutch jaw 45 formed on one end of a sleeve 46 keyed to the shaft 26. The hub of the gear 32 is mounted on a sleeve 47 provided with a flange 48. Pins 49 are mounted in this flange and project into openings 50 in the gear to center the gear relative to the sleeve. The gear 32 is normally urged to the position shown in Fig. 1 where the clutch jaws 44 and 45 engage by a plurality of springs 51 interposed between the flange 48 and said gear and surrounding pins 52, mounted on said flange and free to work in recesses 53 in the hub of said gear. It is also to be noted that the gear 32 may be moved toward the left against the action of springs 51 to disengage the jaw clutches 44 and 45.

The angles of the teeth of the spiral gears 30 and 32 are so designed that the thrust of these gears relative to each other is used to move the gear 32 to engage and disengage it from the sleeve 46 and hence the shaft 26. Thus when the gear 32 is the driver the thrust on said gear will act in conjunction with the springs 51 to bring the gear into clutched engagement with the sleeve 46 but when the gear 32 becomes the driven member then the thrust on said gear will act in the opposite direction and serve to move said gear to the left to completely disengage the clutch jaws 44 and 45.

The gear 33 has a sleeve extension 54 provided with a clutch jaw 55 adapted to mesh with a clutch jaw 56 formed on one end of a sleeve 57 keyed to the shaft 26.

The hub of the gear 33 is mounted on a sleeve 58 provided with a flange 59. Pins 60 are mounted in this flange and project into openings 61 in the gear to center the gear relative to the sleeve. The gear 33 is normally urged to the position shown in Fig. 1 when the clutch jaws 56, 55 are engaged by a plurality of springs 62 interposed between the flange 59 and said gear and surrounding pins 60, mounted on said flange and free to work in recesses 61 in the hub of said gear. It is also to be noted that the gear 33 may be moved toward the right against the action of the springs 62 to disengage the clutch jaws 55 and 56.

The angles of the teeth of the spiral gears 31 and 33 are so designed that the thrust of these gears relative to each other is used to move the gear 33 to engage and disengage it from the sleeve 57 and hence the shaft 26. Thus when the gear 33 is driven the thrust on said gear will act in conjunction with the springs 62 to bring said gear into clutched engagement with the sleeve 57 but when the gear 33 becomes the driven member then the thrust on said gear will act in the opposite direction and serve to move said gear to the right to completely disengage the clutch jaws 55 and 56.

The flanges 48 and 59 abut against a thrust washer 63 interposed between them and the sleeves 47 and 58 while adapted to react through the washer 63 are limited in their longitudinal movement relative to the shaft 26 by the stop collars 47' and 58' on said shaft. The thrust of the flanges 59 and 48 on the washer 63 is preferably sufficient to create a drag on the sleeves 47 and 58 relative to the gears 32 and 33 so as to assist the thrusting action of the gears 30 and 31 upon said gears 32 and 33.

The gear 31 is adapted to be connected to the shaft 22 to establish the second speed gear ratio by speed responsive clutch mechanism and the gear 21 is adapted to be connected to the shaft 22 to establish the direct drive by speed responsive clutch mechanism both of these mechanisms being here shown as operated by the same speed responsive device.

The shaft 22 has a splined portion 64 upon which clutch members 65 and 66 are slidably splined. The gear 31 has a jaw clutch face 67 adapted to be engaged by the mating face 68 of the member 65 and the gear 21 has a jaw clutch face 69 adapted to be engaged by the mating face 70 of the member 66, the jaws of these clutch elements being of the type having inclined faces so that they may slip past or overrun each other until conditions are right for engagement.

Figure 2:
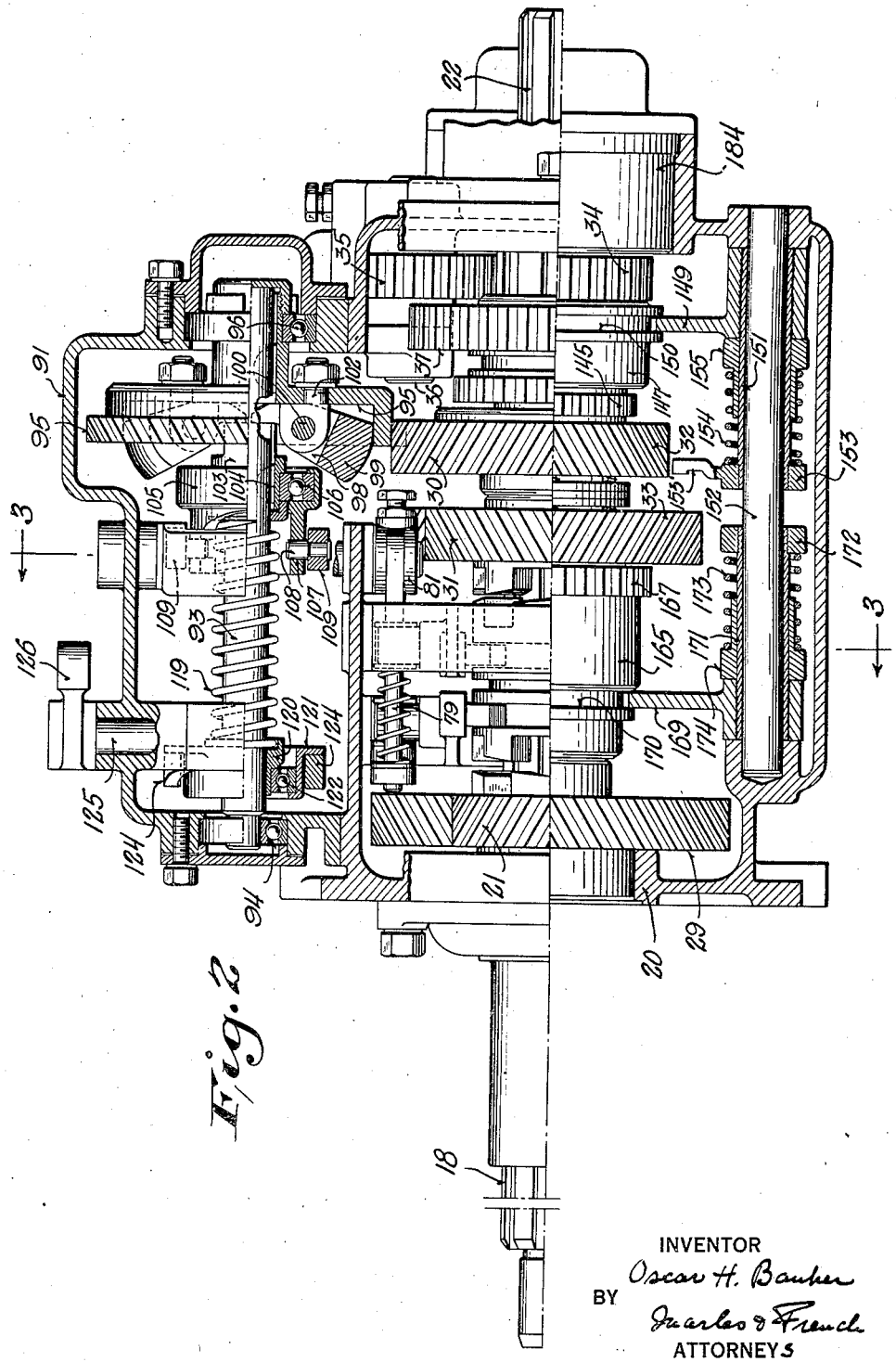
Fig. 2 is a horizontal sectional view through the transmission taken generally on the broken line 2—2 of Fig. 3, parts being shown in section and parts being broken away.

The clutch member 65 has an annular groove 71 in which the end portions of a shifter fork 72 are operatively disposed and the clutch member 66 a similar groove 73 in which the end portions of a shifter fork 74 are operatively disposed. Referring to Figs. 1, 2, and 5, the fork 72 is pivotally mounted on a shaft 75 and has a crank arm 76 provided with a crank pin 76' and the fork 74 is pivotally mounted on a shaft 77 and has a crank arm 78 provided with a crank pin 78', the shafts 75 and 77 being also suitably pivotally supported in the casing 20. The arms 76 and 78 are operatively connected together through links 79 and 80 pivotally connected to the oppositely disposed ends of a lever 81 detachably secured to a shaft 82. A coiled spring 83 is mounted between the outer end of the link 79 and a collar 84 thereon, the link passing loosely through an opening 85 in the crank pin 76' of the arm 76, there being a collar 86 on the link engaging the opposite side of the crank pin whereby the spring 83 acts as a yielding backing for the clutch member 65 and as the means through which the clutch element is moved on the movement of the shaft 82 and the lever 81. A coiled spring 86 is mounted between the inner end of the link 80 and a collar 87 thereon, the link passing loosely through an opening 88 in the crank pin 78' of the arm 78, there being a collar 89 on the outer end of the link engaging the opposite side of the crank pin whereby the spring 86 acts as a yielding backing for the clutch member 66 and as the means through which the clutch element is moved on the movement of the shaft 82 and the lever 81. A set screw 90 secures the lever 81 to the shaft 82.

Figure 3:
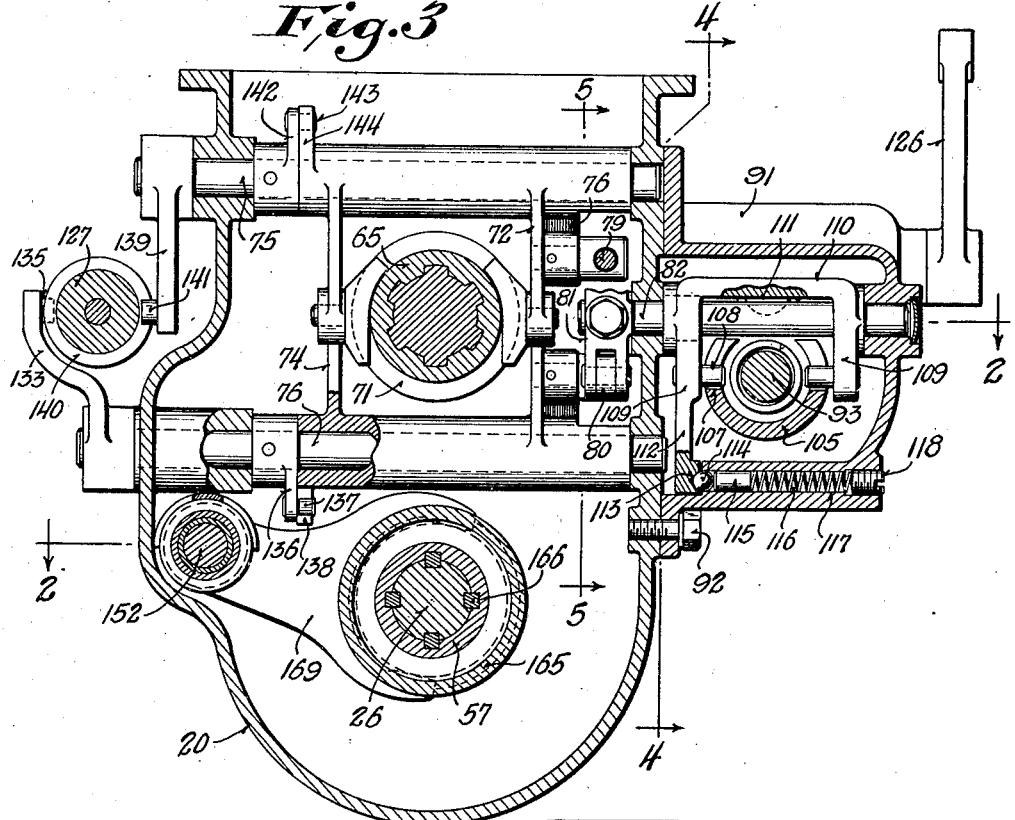
Fig. 3 is a transverse vertical sectional view taken on the line 3—3 of Fig. 2.

A separate casing section 91, shown more particularly in Figs. 2 and 3, is detachably secured by bolts 92 to one side of the main casing 20 and has a shaft 93 journalled therein at one end in the ball bearing journal 94 and at its other end having a gear 95 keyed to it with its hub portion journalled in the ball bearing journal 96, the gear 95 being a spiral gear adapted to mesh with the gear 30 when the casing section 91 is secured to the casing 20 and to be moved out of mesh with said gear 30 when said section 91 is detached from the casing 20. The web of the gear 95 is formed to provide a cylindrical cavity 97 in which oppositely disposed speed responsive elements 98, in the form of levers having weighted ends 99 are mounted, each of these levers being pivotally mounted intermediate its ends on a pin 100 carried in the specially shaped head 101 of a bolt 102 secured to said gear. The inner forked ends of the elements 98 straddle the shaft 93 and engage one end of a sleeve 103 which is slidably keyed, as at 104, to the shaft 93. A sleeve 105 is journalled on a ball bearing journal 106 secured to the sleeve 103 so that the sleeve 105 may move lengthwise with the sleeve 103 but will not rotate with the sleeve. This sleeve 105 has diametrically disposed slots 107 receiving the pin ends 108 on the spaced lever arms 109 of a member 110 keyed at 111 to the shaft 82, one of the arms 109 having a quadrant extension 112 provided with spaced recesses 113 cooperating with a spring pressed detent here shown in the form of a ball 114 engaged by a pin 115 which in turn is backed by a spring 116 mounted in a bore 117 in the casing 91 between said pin 115 and a screw plug 118.

The outward movement of the weighted arms 99 under the influence of centrifugal force is resisted by a spring 119 interposed between the collar 103 and a collar 120 freely shiftable lengthwise of the shaft whereby the tension of the spring 119 may be varied. This collar 120 has a shift colllar 121 connected thereto through a ball bearing journal 122 so that said collar 121 may move lengthwise with the collar 120 but will not rotate therewith. The flange 123 on the collar 121 is adapted to be engaged by the forked portions of a shifter fork 124 secured to a shaft 125 pivoted in the casing 91 and carrying an operating arm 126 under the control of the operator, at his driving station through any suitable linkage. The flange 123 may also be slotted to engage a guide pin 127 secured to the casing.

Figure 4:
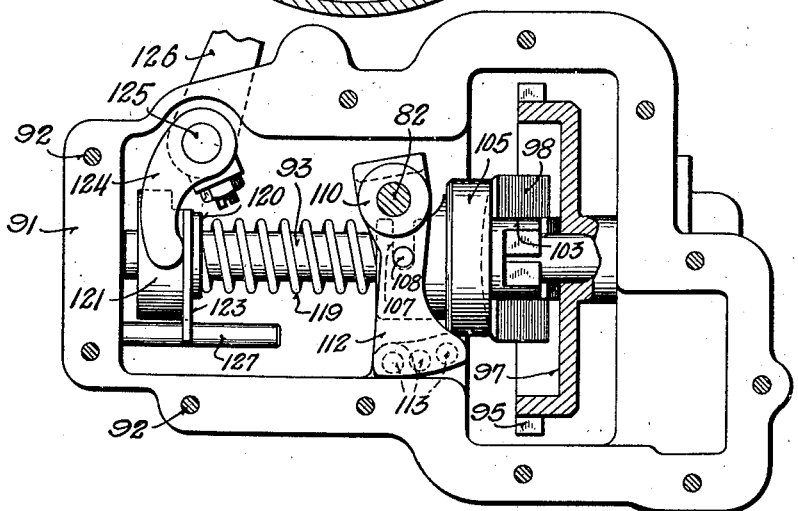
Fig. 4 is a transverse vertical sectional view taken on the line 4—4 of Fig. 3.

With the above described construction, as the speed of the driven shaft 22 increases the speed of governor shaft 93 driven therefrom will likewise increase and when the speed of said shaft 93 reaches a predetermined value the weighted arms 99 will move outwardly under the influence of centrifugal force and against the action of the spring 119 and shift the collars 103 and 105 toward the left as viewed in Fig. 2, and thus, through the action of the collar 105 on the arms 109, turn the shaft 82 in a clockwise direction, as viewed in Fig. 5. Turning of the shaft 82 in this direction acts through the lever 81 and the links 79 and 80 to compress the springs 83 and 86 so that they exert a yielding pressure upon the arms 76 and 78 of the shifter forks 72 and 74 and through said forks act upon the clutch members 65 and 66 and move said clutch members toward their mating clutch members 67 and 69 and in overruning relation therewith. Since the gear 31 is rotating slower than gear 21, the clutch faces 67 and 68 synchronize first upon a temporary deceleration of the engine by the closure of the engine throttle and hence engage and upon immediate acceleration of the shaft 18 the transmission is in second gear. Thereafter, as the speed of the driven shaft 22 increases the clutch faces 70 and 69 are overrunning each other until a second deceleration synchronizes them with each other which may be brought about by another temporary deceleration of the engine by the closing of the engine throttle and then on acceleration of the drive shaft 18 the transmission is in high gear. The spring pressed ball 114 cooperates with the recesses 113 of the quadrant 112, as the member 110 and the shaft 82 are turned under the action of the governor, so as to hold the member 112 and consequently the linkage connected therewith in the position they have been advanced by the governor, the ball acting on said linkage to prevent the governor from hunting and to cause the release of the linkage at a certain definite speed. When the speed of the driven shaft falls below a certain speed, for example seven miles per hour, the ball 114 which is then in the last notch at the right in Fig. 4, is released therefrom and the lever including the quadrant 112 tends to tilt back toward its original position but at this speed it is so arranged that the ball 114 catches in the second notch of the quadrant and holds it and its associated linkage in position. It is to be noted that clutch jaw 65 has a shorter travel for disengagement from jaw 67 than jaw 70 from jaw 69 whereby upon acceleration the clutch jaws 70 and 69 being still partially engaged the transmission is in second gear. Further reduction in speed of the vehicle to a car speed of say five miles per hour would have caused the speed responsive elements 98 to assume their initial postion and the ball 114 to move into engagement with the first of the notches 113 as shown in Fig. 4 and thus put the transmission in low.

It is also to be noted that since the tension of the spring 119 is under the direct control of the operator that the speed at which the governor brings the clutch members 68 and 67 into position for engagement may be varied and consequently the speeds at which disengagement of these clutch members and the clutch members 70 and 69 takes place may be varied.

It is further to be noted that loosening up the set screw 90 so that the shaft 82 may be removed from the lever 81 and removing the bolts 92 permits the casing 91 and the governor assembly therein to be removed as a unit so that the parts thereof may be separately serviced if desired.

With the above described arrangement, when the gear member 37 with its jaw clutch 39 is shifted toward the left to engage the jaw clutch 40 for forward drive and the engine clutch is engaged so that shaft 18 is being driven by the engine, the drive proceeds from shaft 18 through gears 21 and 29 to shaft 26 and thence through gears 32 and 30 to shaft 22 with the vehicle in low gear and under these conditions the gear 33 is also rotating gear 31 but at a faster speed than the shaft 22. As the speed of the driven shaft 22 is increased the speed responsive mechanism acts, as previously described, upon the clutches 65 and 66 moving them outwardly and, when a certain predetermined speed is attained, the clutch jaw 68 will be moved to a position to engage clutch jaw 67 when, by a temporary reduction in speed of the shaft 18, the speed of the driven gear 31 decreases and synchronizes with the speed of the driven shaft 22. During this reduction in speed of the shaft 18, the shaft 22 becomes the driver and gear 30 then acts to drive the gear 32 and thus exerts a shifting thrust upon the same to disengage the clutch parts 44 and 45 and the transmission is then in second gear with the drive proceeding from the shaft 26 through gears 33 and 31, the clutch 67, 68 to shaft 22. As the speed of the driven shaft 22 increases the governor elements 98 remain in fully expanded position since said elements have attained this position at a relatively low speed, for example as low as five miles per hour car speed and while keeping the clutch jaws 67, 68 engaged and the clutch jaw 69 is overrunning the clutch jaw 70, actual clutched engagement of the jaws 70 and 69 taking place, when by a temporary reduction in speed of the drive shaft 18, the speed of the gear 21 is reduced so that its speed will synchronize with that of the shaft 22. During this reduction in speed of the shaft 18, the shaft 22 becomes the driver and gear 31 then acts to drive the gear 33 and thus exerts a shifting thrust upon the same to disengage the clutch parts 55 and 56 and the transmission is then in high gear or direct drive with the gears 32 and 33 disconnected from the shaft 26, and the drive proceeding directly from shaft 18 through clutch 69, 66 to the driven shaft 22. Thus an automatic and progressive change in gear ratio from low to second and second to high may be effected. It has also been noted that the tension of the governor spring 19 may be readily adjusted so that direct drive may be effected at a low or high speed depending upon the operator's wishes and to suit different driving conditions. Also if the operator on his first deceleration of the shaft 18 as previously described waits for a longer period before accelerating the motor the direct drive connection may be effected substantially directly from low since the clutch parts 66 and 69 will then engage. It is also to be noted that the engine may be accelerated to its full speed in any ratios of the gear and that the speed responsive mechanism will not under these conditions change the established relation since the clutch engaging pressure is not increased with increase in speed.

It has previously been noted that when the vehicle is in high or direct drive if it slows down to such a speed as to permit the release of the high speed position of the speed responsive mechanism the clutch jaws 70 and 69 will be disconnected to establish the second speed ratio and upon a further reduction in speed of the shaft 22 the speed responsive mechanism may act to disconnect the clutch jaws 67, 68 to establish the low speed ratio. In the shifting back from high to second the gear 31 no longer acts to drive the gear 33 and said gear is then shifted back under the action of the springs 62 to bring the clutch elements 55 and 56 into engagement. In the shifting back from second to low the gear 30 no longer acts to drive the gear 32 and said gear is then shifted back under the action of the spring 51 to bring the clutch elements 45, 44 into engagement.

It is sometimes highly desirable in driving to change immediately from high to second or to go into low and in order that the operator, with the present automatic shift, may not have to wait for a reduction in speed of the vehicle to effect this change, means have been provided under the control of the operator for placing the vehicle in second or low gear. For this purpose manually operated means are associated with the shifter forks 74 and 72 and under the control of a cam member 127 which, as shown in Fig. 10, is journalled in bearings 128 on the outside of the casing 20 and has a bevel gear 129 secured to it and meshing with a segmental gear 130 pivoted at 131 on the casing and having a lever arm 132 adapted to be connected with any suitable operating linkage arranged for operation for the driver of the vehicle. For manually shifting the clutch member 66, so as to disengage the clutch jaws 69 and 70, the shaft 76 is shifted by the turning of the lever 133 thereon through the action of the cam groove 134 on the pin 135 at the outer end of said lever, the shaft 76 having a lost motion actuating connection with the shifter fork 74 through an arm 136 on said shaft carrying a pin 137 engageable with a lug 138 projecting from the hub of said fork, this connection permitting the governor mechanism to actuate said fork 74 independently of said manual control and permitting actuation of said fork on the turning of said cam member to either side of the mid portion shown in Fig. 11. For manually shifting the clutch member 65, so as to disengage the clutch jaws 67 and 68, the shaft 75 is shifted by the turning of the lever 139 thereon through the action of the cam groove 140 on the pin 141 at the outer end of said lever, the shaft 75 having a lost motion actuating connection with the shifter fork 72 through an arm 142 on said shaft carrying a pin 143 engageable with a lug 144 projecting from the hub of this fork, this connection permitting the governor mechanism to actuate said fork 74 independently of said manual control and permitting actuation of said fork on the turning of said cam member in the direction of the upwardly pointing arrow as viewed in Fig. 11. The profiles of the grooves 134 and 140 are identical and act to move levers 133 and 139 simultaneously for disengagement of both clutches but as explained before since clutch jaws 69 and 70 are shorter than jaws 67 and 68, the clutch jaws 69 and 70 are disengaged before the clutch jaws 67 and 68.

It is sometimes desirable to maintain the vehicle in second or in low gear to permit the engine to act as a brake when descending steep grades and in the present instance means under manual control and associated with cam 127 have been provided for selectively locking the transmission in second or low gear ratio. For locking in low gear ratio the sleeve 43 has jaw clutch teeth 145 formed thereon adapted to engage the teeth of a jaw clutch internal gear 146 formed on a shiftable clutch element 147, the teeth of the gear 146 also meshing with the similar gear teeth 148 formed on the clutch sleeve 46 and thus forming a splined connection therewith. Thus, when the clutch element 147 is shifted toward the left to bring the teeth of gear 146 into mesh with the teeth 145, the gear 32 will be locked to the shaft 26. A shifter fork 149 engages in an annular groove 150 in the clutch element 147 and has its hub secured to one end of a sleeve 151 slidably mounted on a stud shaft 152 and having a stop member 153 secured to its other end, a spring 154 being mounted on this sleeve between the stop 153 and a collar 155 slidably mounted on said sleeve and normally abutting the hub of the fork 149. A link 156 has a forked end 157 connected to the collar 155 by screws 158 and at its other end carries a pin 159 engaged by the forked end of a lever arm 160 secured to a control shaft 161.

journalled in the casing 20 and having an exteriorly disposed operating arm 162 provided with a pin 163 working in the groove 164 in the cam member 127. Thus turning of the cam member 127 in the direction of the upwardly pointing arrow, as viewed in Fig. 11, will act through the parts 162, 161 and 160 upon the link 156 to pull said link and consequently the collar 155 connected thereto to the left and exert pressure on the spring 154 which acts upon the stop 153 and sleeve 151 to move the shifter fork 149 and hence the clutch member 147 into engagement with the clutch element 145 to lock the gear 32 to the shaft 26. The profiles of the grooves 140 and 164 are such that the gear 32 will not be locked to the shaft 26 until after the clutch jaws 67 and 68 are disengaged.

For locking in second gear ratio, a shiftable clutch element 165 is connected by a key 166 to the sleeve 57 and is in the form of a sleeve with a jaw clutch gear 167 at one end adapted to engage the jaw clutch teeth 168 formed as an internal clutch gear in one side of the gear 33. Thus, when the clutch element 165 is shifted toward the right to bring the teeth of gear 167 into mesh with the teeth 168, the gear 33 will be locked to the shaft 26. A shifter fork 169 engages in an annular groove 170 in the clutch element 165 and has its hub secured to one end of a sleeve 171 slidably mounted on the shaft 152 and having a stop nut 172 secured to its other end, a spring 173 being mounted on this sleeve between the stop nut 172 and a collar 174 slidably mounted on said sleeve and normally abutting the hub of the fork 169. A link 175 has a forked end 176 connected to the collar 174 by screws 177 and at its other end carries a pin 178 engaged by the forked end of a lever arm 179 secured to a shaft 180 journalled in the casing 20 and having an exteriorly disposed operating arm 181 provided with a pin 182 working in the groove 183 in the cam member 127. Thus turning of the cam member 127 in the direction of the downwardly pointing arrow, as viewed in Fig. 11 will act through the parts 181, 180, and 179 upon the link 175 to pull said link and consequently the collar 174 connected thereto to the left and exert pressure on the spring 173 which acts upon the stop 172 and sleeve 171 to move the shifter fork 169 and hence the clutch member 165 into engagement with the clutch teeth 168 to lock the gear 33 to the shaft 26. The profiles of the grooves 134 and 183 are such that the gear 33 will not be locked to the shaft 26 until after the clutch jaws 69 and 70 are disengaged.

It is to be noted in connection with the second and low speed locking clutches, that the number of teeth of each of these clutches is the same as the number of teeth of the second and low speed ratchet clutches and that both sets of teeth of these respective clutches are alined with each other so that, when a ratchet jaw clutch is engaged, the positive jaw clutch associated with it may be engaged or disengaged without any interference with other parts.

When the vehicle is standing on a hill or is in a position where it may roll backwards when the transmission is in position for forward drive in order to prevent such backward movement I have provided an automatic one-way brake for holding the shaft 26 against reverse rotation. This brake includes a drum 184 secured to the housing 20, rollers 185 engageable with the drum under the action of an actuator 186 having a lost motion connection with a sleeve 187 splined to the shaft 26. The lost motion connection is provided by a laterally extending lug 188 on the hub of the actuator which is adapted to be engaged by a radially disposed lug 189 on the sleeve 187 after a certain amount of relative angular movement of these parts. This is necessary to permit ready release for either forward or reverse conditions of the transmission since it provides enough lost motion to readily free the parts from the pressure of the locking rollers.

The control of the low and second speed clutches through the cam member 127 and the operation of the control lever 132 has been previously described and in this connection it is to be noted that the stop member 153 has a finger portion 153' adapted to cooperate with the gear 33 so as to prevent said gear from being shifted toward the right from its position shown in Fig. 1 to a position where the clutch jaws 55 and 56 are disengaged when the low gear positive clutch has been engaged and the stop member 153 has been moved toward the left to bring its finger portion 153' into operative position to prevent the movement of the gear 33 to a released position. This will assure that, regardless of the acceleration or deceleration while driving, gear 31 will never synchronize with the driven shaft 22 to allow engagement of the clutch jaws 67, 68 which under the condition of being locked in low would wreck the transmission.

For shifting the member 38 to establish the forward, neutral and reverse positions of the transmission, a shifter fork 190 engages an annular groove 191 in said member 33 and has its hub slidably mounted on a guide shaft 192. The hub 193 of said fork is slotted as at 194 for engagement with the pin end 195 of a lever 196 mounted on a rotatable control shaft 197 having an exterior lever arm 198 which may be operated in any suitable manner as by a connection with an engager on the dash as shown in my United States Letters Patent No. 1,843,195 dated February 2, 1932.

The modified form shown in Figs. 12 to 16 inclusive is the same as that previously described except that overrunning clutches of the roller type are used between the drive shaft and the low and second speed gears on the auxiliary shaft. Briefly, the numeral 18'' designates the drive shaft and 21' the gear thereon and meshing with a gear 29' operatively connected through an overrunning clutch hereinafter described with an auxiliary shaft 26' having gears 32' and 34' splined thereto and also having a gear 33' mounted thereon, the gears 33' and 32' meshing with the gears 31' and 30' on the driven shaft 22', the above prime numeralled parts corresponding respectively with the parts 18, 21, 29, 26, 32, 34, 33, 31, 30 and 22 of the first described construction.

Clutch members 65' and 66', similar to the members 65 and 66, are slidably splined on the shaft 22' and have clutch jaws 68' and 70' of the overrunning type adapted to cooperate with the clutch jaws 67' and 69' in the same way as the jaws 68 and 70 cooperate with the jaws 67 and 69 and are similarly controlled, the only difference being in a rearrangement of the clutch shifting linkage whereby the shifter forks 72' and 74' controlling the elements 65' and 66' both work from above the driven shaft 22' upon and in conjunction with the shafts 75' and 76' in the same way that the forks 72 and 74 work on and in conjunction with the shafts 75 and 76. As shown more particularly in Fig. 14 the linkage connection between the governor operated shaft 82 includes a lever 81' and links 79' and 80' operatively connecting said lever respectively with the forks 72' and 74' through yielding connections similar to those previously described in connection with Fig. 5 and including springs 83' and 86', the lever 81' acting through the spring 83' upon the link 79' and fork 72' to move the clutch member 65' toward clutch engaging position and acting through the spring 86' upon the link 80' and fork 74' to move the clutch member 66' toward clutch engaging position.

The auxiliary shaft 26' is mounted in bearings 27' and 28' in the end walls of the casing and has a ball bearing 199 mounted thereon on which the gear 29' is journalled. As shown in Figs. 12 and 15 the gear 29' has a drum extension 200 adapted to be engaged by clutch rollers 201, under the action of an actuator 202 keyed to the shaft 26', and also adapted to be engaged by clutch rollers 203 under the action of an actuator 204 keyed to the hub 205 of the gear 33'. The gear 33' is journalled in part on the ball bearing 206 and in part on the sleeve bearing 207 on the shaft 26'. The one way roller clutches are of known construction in which, as is shown in detail in Fig. 13, the rollers 201 work in recesses 208 having inclined surfaces 209 to wedge said rollers against the drum 200 under relative movement of the drum and actuator in one direction and release of the rollers under relative movement of the drum and actuator in the opposite direction.

A shifting gear member 37', shown in neutral position in Fig. 12, is adapted to cooperate with the back gear 35' for reverse and has an annular internal gear portion 39' to engage the clutch gear 40' on the hub of gear 30' for forward drive, the member 37' being slidably keyed to a sleeve 24' splined to the shaft 22'.

With the modified construction when the clutch parts 39' and 40' are engaged and the engine is driving the shaft 18" and gear 21', the gear 29' is being driven and through the drum 200, rollers 201, actuator 202, shaft 26', gear 32' and 30' drives the shaft 22'. While in low gear the gear 31' is turning freely on the driven shaft 22'.

When the speed of the transmission in low gear is such that the governor mechanism previously described may function to bring the clutch members 65' and 70' into overrunning relation with the clutch parts on the gears 31' and 21', then, upon a temporary deceleration of the engine by the closure of the engine throttle, the clutch jaws 68' and 67' may be made to synchronize and hence engage and upon acceleration of the drive shaft 18", the transmission will be in second gear since under these conditions, the gear 30' being of larger diameter than the gear 31' will revolve the gear 32' at a faster rate of speed than the gear 33' is revolving so that the shaft 26' and actuator 202 will revolve at a higher rate of speed than the drum 200 and hence the rollers 201 will be released from said drum and the drive will then proceed from gear 29' through drum 200, rollers 203, actuator 204, hub 205, gears 33' and 31' to the driven shaft 22'. Thereafter as the speed of the driven shaft 22' increases, the clutch jaws 69' and 70' are overrunning each other until a second deceleration of the shaft 18" synchronizes them with each other so that they engage and upon acceleration of the drive shaft 18", the transmission is in high gear since under these conditions not only is the low speed roller clutch overrunning but since the gear 31' is of larger diameter than the gear 21' it will revolve the gear 33' at a faster rate of speed than the gear 29' is revolving so that the actuator 204 will revolve at a higher rate of speed than the drum 200 and hence the rollers 203 will be released from said drum and the drive will then proceed from shaft 18' to the driven shaft 22'. When on a release of the clutch jaws 69' and 70', either by manual or governor operation, the second speed automatic clutch including the rollers 203 will again become operative, the transmission will be in second gear and then on a release of the clutch jaws 68' and 67', either by manual or governor operation, the low speed automatic clutch including the rollers 201 will again become operative and the transmission will be in low gear.

For locking in second speed, in Fig. 12, I have shown a clutch gear 208 slidably splined on the hub 205 of the gear 33' and adapted to mesh with an internal clutch gear 209 formed as a part of the drum 200.

In Figs. 15 and 16 I have shown an arrangement for locking in second speed and also in low. In this instance the drum 200', rollers 201', actuator 202', rollers 203' and actuator 204' correspond respectively with the drum 200, rollers 201, actuator 202, rollers 203 and actuator 204 of the construction shown in Fig. 12. For locking in second, a clutch member 208' is slidably splined on the hub of the gear 33' and is provided with a clutch gear 209' adapted to mesh with an internal clutch gear 210 formed as a part of the drum 200'. For locking in low the clutch member 208' has segmental clutch gear portions 211 adapted to be moved into mesh with an internal segmental clutch gear part 212 formed as a part of or connected to the actuator 202', the engagement of these clutch parts taking place after the clutch parts 209' and 210 are engaged. Thus the clutch member 208' on its movement toward the left, as viewed in Fig. 15, successively locks the transmission in second and low gear, the actuator 204' being slotted as at 211', so as to permit the clutch portions 211 to move freely therethrough. Any suitable controls may be associated with the shiftable clutch members 208 and 208' to control their operation.

The general operation of the transmission and its control by the operator is very simple. With the vehicle at rest and the member 38 and 37' in a neutral position, the operator starts the engine in the usual manner and with a manually controlled engine clutch between the engine and the shaft 18 or 18" the member 38 or 37' is shifted from neutral to forward position while the engine clutch is disconnected. Thereafter the engine clutch is allowed to engage and the shaft 18 or 18" is then driven direct from the engine. Under these conditions the operator may proceed from first to second automatically and from second to high through the operation of the speed responsive clutch mechanism as previously described.

If under conditions of driving while the operator is proceeding in high gear, he wishes to immediately proceed in second, he operates the manual control which acts to shift the clutch member 66 or 66' to a release position and the vehicle then proceeds in second gear. If while driving down hill he wishes to use the engine as a brake he puts the vehicle in second as heretofore described and operates the control for the second speed locking clutch 54, 168 of the first described construction, 208, 209 of the modified form shown in Fig. 12, or 208', 210 of the form shown in Fig. 15. Engagement of the clutch 54, 168 positively connects the gear 33 with the shaft 26 while engagement of the locking clutch 208, 209 or 208', 210 connects the gear 33' with the drum 200 or 200'. If under conditions of driving while in high gear or in second, the operator wishes to proceed in low he operates the control which acts to release the high speed clutch if it is then engaged and then to shift the clutch member 65 or 65' to a release position and the vehicle then proceeds in low gear. The locking in low gear is, in the first described construction, accomplished by shifting the member 147 into engagement with the clutch gear 145 while, in the form shown in Fig. 15, the shifting of the member 208' to bring the clutch parts 211 into mesh with the clutch parts 212 effects this result. The operator's changing from high to second and second to low under ordinary conditions is brought about by the speed responsive mechanism as previously described. If he desires to reverse the vehicle he shifts the gear 37 or 37' into mesh with the back gear 35 or 35' when the vehicle is standing still and then the engine clutch is engaged so that it is then connected to drive the transmission in reverse.

The casing 20 is provided with a large opening 20" in its top and the casing 20' with the similar opening for giving ready access to the parts of the device and which opening, in each instance, is closed by a removable cover (not shown).

I desire it to be understood that this invention is not to be limited to any particular form or arrangement of parts except in so far as such limitations are included in the claims.

What I claim as my invention is:

1. In a variable speed transmission, the combination of a drive shaft, a driven shaft alined with said drive shaft, an auxiliary shaft, in-mesh transmission gear sets between said auxiliary shaft and said drive and driven shafts including second and low speed gear sets, automatic clutches of the overrunning type for respectively connecting the second and low speed gears on said auxiliary shaft in driving relation with their companion gears, positive jaw clutch mechanisms for selectively connecting said second and low speed gears on said auxiliary shaft in constant second or low speed gear ratio, speed responsive clutch mechanism for connecting the second speed gear set to the driven shaft for second speed, and speed responsive clutch mechanism for connecting said drive shaft directly with said driven shaft.

2. In a variable speed transmission, the combination of the drive shaft, a driven shaft, change speed gearing between said shafts for low and second speed gear ratios including sets of constant mesh gears, clutch mechanisms for automatically connecting certain of the gears of said gear sets in driving relation, overrunning jaw clutch mechanism for establishing direct drive connection between said shafts including a shiftable clutch member, speed responsive means for actuating said shiftable clutch member to establish said direct drive connection, and manually operated means for shifting said shiftable clutch member to release said direct drive connection regardless of the speed of said shafts.

3. In a change speed transmission, the combination of a drive shaft, a driven shaft, change speed reduction gearing between said shafts, a jaw clutch of the overrunning type for connecting said shafts through said gearing, a jaw clutch of the overrunning type for connecting said shafts together for direct drive, each of said jaw clutches including a clutch jaw movable into engagement with a mating clutch jaw, speed responsive means for bringing both of said movable clutch jaws into overrunning engagement with their mating jaws, one of said clutches being engaged for connecting said shafts through said gearing when the parts thereof are synchronized upon a deceleration of said drive shaft, the other of said clutches being engaged thereafter to establish direct drive upon a further deceleration of said drive shaft, and manually operable means to release said jaw clutches.

4. In an automatic transmission, the combination of a drive shaft, a driven shaft, change speed gearing between said shafts for low and second gear ratios including releasable gears, means for positively locking said gearing in low speed, clutch mechanism for connecting said shafts through said gearing for second speed, clutch mechanism for connecting said shafts together for direct drive, speed responsive means for actuating said clutch mechanisms, means to release said clutch mechanisms for direct drive and second speed, and an operator controlled member for successively operating said last named means and said means for positively locking said gearing in low speed.

5. In a change speed transmission, the combination of a drive shaft, a driven shaft, change speed reduction gearing between said shafts for low and second speed gear ratios including sets of constant mesh gears, overrunning clutches for automatically connecting certain of the gears of said gear sets in driving relation successively for low and second speeds, a jaw clutch for connecting one of the gears to the driven shaft for second speed, a jaw clutch for connecting said shafts together for direct drive, speed responsive means for actuating said last two named clutches, and manually operable release means for each of said two last named clutches.

6. In an automatic transmission, the combination of a drive shaft, a driven shaft alined with said drive shaft, an auxiliary shaft, a drive gear on said drive shaft, a gear on said auxiliary shaft meshing with said drive gear, a clutch drum connected to said last named gear, low and second speed gears on said auxiliary shaft, automatic clutch mechanism for connecting said low and second speed gears to said clutch drum, low and second speed gears on said driven shaft in constant mesh with said low and second speed gears on said auxiliary shaft, clutch mechanism for connecting the second speed gear on said driven shaft to said shaft, clutch mechanism for connecting said drive and driven shafts together for direct drive, and speed responsive means for actuating said two last named clutch mechanisms.

7. In an automatic transmission, the combination of a drive shaft, a driven shaft alined with said drive shaft, an auxiliary shaft, a drive gear on said drive shaft, a gear on said auxiliary shaft meshing with said drive gear, a clutch drum connected to said last named gear, low and second speed gears on said auxiliary shaft, automatic clutch mechanism for connecting said low and second speed gears to said clutch drum, low and second speed gears on said driven shaft in constant mesh with said low and second speed gears on said auxiliary shaft, clutch mechanism for connecting the second speed gear on said driven shaft to said shaft, clutch mechanism for connecting said drive and driven shafts together for direct drive, speed responsive means for actuating said two last named clutch mechanisms, clutch mechanisms for positively locking said low and second speed gears on said auxiliary shaft to said drum, and means for releasing said speed responsive actuated clutch mechanisms prior to the engagement of said locking clutches.

8. In a change speed transmission, the combination of a drive shaft, a driven shaft, change speed reduction gearing between said shafts for low and second speed gear ratios including sets of constant mesh gears, overrunning clutches for automatically connecting certain of the gears of said gear sets in driving relation successively for low and second speeds, a clutch for connecting one of the gears to the driven shaft for second speed a clutch for connecting said shafts together for direct drive, spring means for releasing one of the clutch members of each of said clutches, speed responsive means operable through said spring means on the said clutch members of said last two named clutches, and a manually operable release for the clutch connecting said shafts together for direct drive.

9. In a variable speed transmission, the combination of a drive shaft, a driven shaft alined with said drive shaft, an auxiliary shaft, change speed gearing connecting said shafts together for low and second speed gear ratios, a free wheeling clutch connection between said low speed gearing and said driven shaft, a free wheeling clutch connection for said second gear ratio including a clutch drum on said auxiliary shaft, speed responsive clutch mechanism for establishing second speed ratio through said gearing, positive jaw clutch mechanism for connecting said clutch drum to one of the gears of said second speed gear set, and speed responsive clutch mechanism for connecting said drive and driven shafts together for direct drive.

10. In an automatic transmission, the combination of a drive shaft, a driven shaft alined with said drive shaft, an auxiliary shaft, a drive gear on said drive shaft, a gear on said auxiliary shaft meshing with said drive gear, a clutch drum connected to said last named gear, a change speed gear on said auxiliary shaft, automatic clutch mechanism for connecting said last named gear to said clutch drum, a gear on said driven shaft in constant mesh with said change speed gear, speed controlled clutch mechanism for connecting the gear on said driven shaft to said shaft, and speed responsive clutch mechanism for connecting said drive and driven shafts together for direct drive.

OSCAR H. BANKER.